US010673525B2

(12) United States Patent
Boruah et al.

(10) Patent No.: US 10,673,525 B2
(45) Date of Patent: Jun. 2, 2020

(54) FREE SPACE OPTICAL COMMUNICATION SYSTEM, APPARATUS AND A METHOD THEREOF

(71) Applicants: The Secretary, Department of Electronics and Information Technology (DEITY), New Delhi (IN); Indian Institute of Technology Guwahati, Guwahati (IN)

(72) Inventors: Bosanta Ranjan Boruah, Guwahati (IN); Santanu Konwar, Guwahati (IN)

(73) Assignees: THE SECRETARY, DEPARTMENT OF ELECTRONICS AND INFORMATION TECHNOLOGY, New Delhi (IN); INDIAN INSTUTE OF TECHNOLOGY GUWAHATI, Assam, Guwahati (IN)

( * ) Notice: Subject to any disclaimer, the term of this patent is extended or adjusted under 35 U.S.C. 154(b) by 0 days.

(21) Appl. No.: 15/745,142

(22) PCT Filed: Jul. 15, 2016

(86) PCT No.: PCT/IB2016/054233
§ 371 (c)(1),
(2) Date: Jan. 16, 2018

(87) PCT Pub. No.: WO2017/009808
PCT Pub. Date: Jan. 19, 2017

(65) Prior Publication Data
US 2019/0013865 A1 Jan. 10, 2019

(30) Foreign Application Priority Data
Jul. 15, 2015 (IN) .......................... 2153/DEL/2015

(51) Int. Cl.
*H04B 10/112* (2013.01)
*H04B 10/516* (2013.01)
(Continued)

(52) U.S. Cl.
CPC ....... *H04B 10/1121* (2013.01); *H04B 10/516* (2013.01); *H04B 10/548* (2013.01);
(Continued)

(58) Field of Classification Search
None
See application file for complete search history.

(56) References Cited

U.S. PATENT DOCUMENTS 5,120,128 A 6/1992 Ulich et al.
7,197,248 B1 * 3/2007 Vorontsov .......... H04B 10/1127
398/119
(Continued)

FOREIGN PATENT DOCUMENTS

CN 102288305 A 10/2012

OTHER PUBLICATIONS

Gibson et al: "Free-space information transfer using light beams carrying orbital angular momentum", Optics Express, vol. 12., No. 22, Nov. 1, 2004, pp. 5448-5456.*
(Continued)

*Primary Examiner* — Li Liu
(74) *Attorney, Agent, or Firm* — The Dobrusin Law Firm, PC (57) ABSTRACT

The present invention provides a free space optical communication system that uses orthogonal modes of aberration in a laser beam as means for encoding the information. The system comprises a transmission station which transmits the user defined information in terms of the amplitudes of certain orthogonal aberration modes present in the transmitted beam. The beam then travels through free space before
(Continued)

it reaches the receiving station. The receiving station comprises a high speed wavefront sensor of light beams. The wavefront sensor measures the amplitudes of various orthogonal aberration modes present in the incident beam at different instants of time. The amplitudes of the orthogonal modes at a certain regular time interval are then used to extract the user information.

29 Claims, 5 Drawing Sheets (51) Int. Cl.
*H04B 10/69* (2013.01)
*H04B 10/548* (2013.01)
*G01J 9/00* (2006.01)

(52) U.S. Cl.
CPC ...... *H04B 10/697* (2013.01); *G01J 2009/002* (2013.01); *H04B 2210/25* (2013.01)

(56) References Cited

U.S. PATENT DOCUMENTS

| 7,343,099 | B2 | 3/2008 | Wirth et al. | |
|---|---|---|---|---|
| 8,822,905 | B2* | 9/2014 | Ryf | G02B 6/4206 250/216 |
| 2007/0223936 | A1* | 9/2007 | Babbitt | G01J 9/04 398/182 |
| 2008/0265130 | A1* | 10/2008 | Colomb | G01J 9/02 250/201.9 |
| 2010/0232007 | A1* | 9/2010 | Byren | F41H 13/005 359/291 |
| 2010/0271595 | A1* | 10/2010 | Molebny | A61B 3/1015 351/221 |
| 2011/0228386 | A1* | 9/2011 | King | G02B 26/06 359/399 |
| 2015/0286187 | A1* | 10/2015 | Collings | G03H 1/0808 359/9 |
| 2015/0333865 | A1* | 11/2015 | Yu | H04B 10/5161 398/44 |
| 2016/0204896 | A1* | 7/2016 | Yu | H04J 14/086 398/65 |
| 2016/0359558 | A1* | 12/2016 | Baggen | H04B 10/116 |

OTHER PUBLICATIONS

Huang et al: "100 Tbit/s free-space data link enabled by three-dimensional multiplexing of orbital angular momentum, polarization, and wavelength", Optics Letters, vol. 39, No. 2, Jan. 15, 2014, pp. 197-200.*
Tsakiris:"Electro-Optic SLM-based architecture for ternary phase/amplitude filtering", Applied Optics, vol. 30, No. 32, Nov. 10, 1991, pp. 4596-4598.*
PCT Search Report & Written Opinion dated Jan. 16, 2017, Application No. PCT/IB2016/054233.
Gibson et al., "Free-space information transfer using light beams carrying orbital angular momentum", Optics Express vol. 12 Issue. 22 (2004), pp. 5448-5456.
Feng Feng et al., "Free Space Communications with Beam Steering a Two-Electrode Tapered Laser Diode Using Liquid-Crystal SLM", vol. 31, Issue 12, (2013) pp. 2001-2007 (Abstract).
Hao Huang et al., "100Tbit/s free-space data link enabled by three-dimensional multiplexing of orbital angular momentum, polarization, and wavelength", vol. 39, Issue 2, (2014) pp. 197-200 (Abstract).

* cited by examiner

FREE SPACE OPTICAL COMMUNICATION SYSTEM, APPARATUS AND A METHOD THEREOF

TECHNICAL FIELD

The present subject matter described herein, in general, relates to a free space optical communication system. And in particular, the present invention relates to an orthogonal aberration modes based free space optical communication system, apparatus and a method thereof.

BACKGROUND

Free space optics (FSO) is a telecommunication technology that uses optical beam in free space to transmit data between two points. The data can be any user information that is to be transmitted from a transmitter to a receiver within the communication system.

The free space optical communication system provides a number of advantages over the other communication system such as wireless communication system. For instance it provides higher rate of data transfer and chances of eavesdropping or interception of data is less. Further, FSO does not require licensing and distribution of bandwidth. Additionally, such a communication can be useful where the physical connection between the transmitting station and the receiving station is difficult. For example, in cities, the laying of fiber optic cables can be expensive and, in some instances, it can be much more complex than setting up an FSO.

However, FSO suffers from a number of major drawbacks. Some such drawbacks are the effects of atmospheric turbulence or distortions, aberrations or other perturbations, subjected to an optical wave and the absorption of the laser (light) beam by the intervening medium. Such random and uncontrolled aberrations in the optical wavefront are often undesirable as they degrade the performance of the optical system. Further, these drawbacks lead to variations in the beam wavefront and intensity which results in inaccuracies in the receiving station.

In order to increase the data content in the beam, orbital angular momentum (OAM) states of a laser beam may be used. However, laser beam carrying multiple OAM states gets severely affected by the presence of aberrations in the medium through which it travels.

Therefore, in order to overcome the drawbacks, there have been many important developments in the area of free space optical communication. Attempts have been made to come up with a robust system with a very large information carrying capability.

Reference is made to a non-patent literature, Gibson, Graham, et al. Optics Express 12.22 (2004): 5448-5456, wherein a free space communication system is proposed, where light beams carrying orbital angular momentum states is used to carry the information content. The receiving station uses a multiplex hologram to detect the presence or absence of various OAM states. However, the major drawback of this communication system is the susceptibility of OAM modes to aberrations introduced by the intervening medium.

Reference is made to an application, U.S. Pat. No. 7,343,099, which discloses an FSO where the intensity fluctuation in the laser beam is minimized by employing laser speckle tracking and locking principle. However the scheme involve certain number of operations at each instant of the laser beam, making the operating speed of the FSO limited by the capability of the other components involved in the tracking and locking mechanism.

Reference is made to a non-patent literature, Feng, Ian H. White, and Timothy D. Wilkinson, Journal of Lightwave Technology 31.12 (2013): 2001-2007, which proposes a free space communication system using a two-electrode tapered laser followed by a liquid-crystal SLM. The system allows large data content with the SLM facilitating adaptive aberration correction due to the atmosphere. However the rate of aberration correction by the SLM is limited by the response time of the liquid crystal molecules.

Reference is made to a non-patent literature, Hao Huang, et al., Opt. Lett. 39, 197-200 (2014), which discloses a 100 Tbit/s free-space data link system which is made possible by combining orbital angular momentum, polarization, and wavelength based modulation of the laser beam. Although the proposed system has a very large data transfer rate, yet the system suffers from the same limitations due to aberrations as by any other OAM state based FSO.

Reference is made to a non-patent literature, Liu, Wei, et al., Optics and Laser Technology 60 (2014): 116-123, wherein a holographic modal wavefront sensor is disclosed to correct the laser beam in an FSO from aberrations thereby improving the fiber coupling efficiency. However this literature only recited about the mechanism to correct the beam from aberrations and there is no attempt to modify the beam modulation scheme. Further the modal wavefront sensor used charge-coupled device (CCD) detector and thus its speed was limited to the frame rate of the CCD.

Reference is made to patent application, CN 102288305 B, wherein a wave-front sensor of a self-adaptive optical system and a detecting method thereof, is disclosed. The invention provides an adaptive optics wavefront sensor, consisting a binary light intensity modulator, a focusing lens, a single-mode optical fiber, a non-array photodetector and computer components, based on the binary orthogonal aberration mode filtering and detection principle. However this prior art discloses the use of orthogonal aberration modes such as Zernike modes to detect the aberrations present in the incident beam and it does not describe use of the presence or absence of such orthogonal aberration modes as means to encode user information. Besides, the above prior art has made use of binary light patterns which are binarized version of the Zernike mode itself and no tilt was added to the Zernike mode. Further, the light intensity at one location is only considered for each Zernike mode.

Reference is made to patent application, U.S. Pat. No. 5,120,128 A, wherein a wavefront aberration sensor includes a beam splitter, one or more aberration sensor modules and a photodetector for sensing total light power. The aberration sensor modules each provide two voltage outputs from a pair of photodetectors. Differences in the voltage pairs are normalized by the total light power to represent signed aberration amplitudes of phase aberrations present in an input optical beam. The aberration amplitudes may be combined in a digital computer to provide a reconstructed wavefront. However, this prior art discloses a method to measure the presence or absence of a given aberration by dividing the incident beam into two beam and by adding and subtracting equal amount of aberrations from the two beams but it does not make use of binary hologram to realize two copies of a single beam with positive and negative amount of aberrations in the two diffracted beams as is done in the present invention. Further, the above prior art does not teaches about the presence or absence of orthogonal aberration modes as means to encode user information.

Thus, in view of the existing free space optical communication system as discussed above, it is ascertained that there has been a steady progress as far as the capability of the communication system is concerned. However, there exist a need for an FSO communication system that is inherently less susceptible to disturbances such as wavefront distortions and intensity fluctuations introduced by the atmosphere and caters better and faster communication of data in free space, even in presence of distortions introduced by the atmosphere.

SUMMARY

The following presents a simplified summary of the invention in order to provide a basic understanding of some aspects of the invention. This summary is not intended to identify essential features of the claimed subject matter nor is it intended for use in determining or limiting the scope of the claimed subject matter. Its sole purpose is to present some concept of the invention in a simplified form as a prelude to a more detailed description of the invention presented later.

The main object of the present invention is to provide an FSO communication system that is inherently less susceptible to disturbances and intensity fluctuations introduced by the atmosphere.

Another object of the present invention is to provide a free space optical communication system that is based on an orthogonal set of aberration modes.

Yet another object of the present invention is to provide a free space optical communication system for communicating a user data using plurality of orthogonal aberration modes in an incident laser beam.

Accordingly, in first aspect, the present invention provides a free space optical communication system comprising at least one transmitting unit and at least one receiving unit, wherein, said transmitting unit having at least one incident laser beam aberrated using plurality of orthogonal modes, and at least one user data, said transmitting unit comprises:
  at least one light modulator displaying binary holograms and configured to:
    encode using alternate polarity of said user data shifted to ternary numbers, said incident laser beam at two or more consecutive instant of time;
    generate, at least one data encoded laser beam and thereby transmit said data encoded laser beam to said receiving unit;
    wherein said user data in said data encoded laser beam is indicative of amplitudes relative to time of said orthogonal modes;
  said receiving unit communicably coupled with said transmitting unit, receives said data encoded laser beam as one or more input laser beam, wherein said receiving unit comprises:
    at least one wavefront sensor, adapted to:
      detect the presence of aberration in said input laser beam;
      generate, first and second aberration sensor output signals, in the case of the modal wavefront sensor, or only one aberration sensor output signal in the case of the zonal wavefront sensor, corresponding to each input laser beam; and
      transmit said first and second aberration sensor output signals, or said aberration sensor output signal, to a data processing unit for subsequent processing;
    said data processing unit operably coupled to said wavefront sensor and configured to:
      determine, said amplitudes of said orthogonal modes, using, the difference between said first and second aberration sensor output signals or the aberration sensor output signal; and thereby
      decode said user data, using said amplitudes of said orthogonal modes.

In second aspect, the present invention provides an apparatus for transmitting at least one data encoded laser beam having plurality of orthogonal aberration modes in an optical communication system, said apparatus comprising:
  at least two collimating lenses, to collimate said laser beam;
  at least one light modulator unit, adapted to:
    receive said laser beam, transmitted by said collimating lenses:
    generate, using one or more hologram, at least one order of a diffracted beam carrying a user defined phase profile;
    modulate, said order of diffracted beam of said laser beam with a digital order of said user data, at two or more consecutive instants of time;
    generate at least one data encoded laser beam and thereby transmit said data encoded laser beam to a receiving unit, wherein said receiving unit is communicably coupled with said apparatus;
  wherein, said user data in said data encoded laser beam is indicative of amplitudes relative to time of said orthogonal aberration modes.

In third aspect, the present invention provides an apparatus for decoding at least one user data from at least one data encoded laser beam having plurality of orthogonal aberration modes in an optical communication system, wherein said user data being indicative of amplitudes of said orthogonal aberration modes, said apparatus comprising:
  at least one wavefront sensor adapted to:
    receive, said data encoded laser beam as one or more input laser beams from a transmitting unit communicably coupled with said apparatus;
    detect, presence of aberration in said input laser beams;
    generate, at least first and second sensor output signals, in the case of the modal wavefront sensor, or only one aberration sensor output signal in the case of the zonal wavefront sensor, corresponding to each input laser beam;
    transmit, said first and second sensor output signals or said sensor output signal, to a data processing unit for subsequent processing;
  said data processing unit operably coupled to said wavefront sensor, is configured to:
    determine amplitudes of said orthogonal aberration modes, using, the difference between said first and second aberration sensor output signals, or said aberration sensor output signal;
    decode said user data, using said amplitudes of said orthogonal aberration modes.

In fourth aspect, the present invention provides a method for communicating at least one user data from at least one transmitter to at least one receiver in an optical communication system, said method comprising:
  generating, by a laser generating means in said transmitting unit, at least one incident laser beam;
  collimating, by two or more collimating lenses, said incident laser beam;
  incidence, said incident laser beam on at least one light modulator;

generating, by said light modulator displaying at least one hologram, at least one diffracted beam of laser beam having plurality of orthogonal aberration modes;

encoding, by said light modulator, said diffracted beam of said incident laser beam with a digital order of said user data at consecutive instants of time; and thereby generating at least one data encoded laser beam, wherein said user data is indicative of amplitudes of said orthogonal aberration modes;

transmitting, through an atmospheric or free space optical path or at least two lenses positioned in said atmospheric or free space optical path, said data encoded laser beam to said receiver unit;

receiving, by a wavefront sensor in said receiver unit, said data encoded laser beam as one or more input beams;

detecting, by said wavefront sensor, presence of aberration in said input beam;

generating, by multiplex hologram in said wavefront sensor, at least one first and second aberration sensor output signals, in the case of the modal wavefront sensor, or only one aberration sensor output signal in the case of the zonal wavefront sensor corresponding to each input laser beam;

transmitting, by at least one communication means, said first and second sensor output signals, or said sensor output signal, from said wavefront sensor to a data processing unit for subsequent processing;

receiving, at said data processing unit, said first and second sensor output signals or said sensor output signal, and thereby determining, said amplitudes of said orthogonal aberration modes;

decoding, by said amplitudes of said orthogonal modes, said user data.

In fifth aspect, the present invention provides a method for generating at least one data encoded laser beam in an optical communication system, said method comprising:

generating, by a laser generating means in a transmitting unit, at least one incident laser beam;

collimating, by two or more collimating lens, said incident laser beam;

incidence, said incident laser beam on at least one light modulator; generating, by at least one hologram provided on said light modulator, at least one order of a diffracted beam carrying a user defined phase profile wherein said diffracted beam includes plurality of orthogonal aberration modes;

encoding, by said light modulator, a digital order, which is a shifted ternary number, of at least one user data with said diffracted beam of said laser beam at consecutive instants of time;

generating, at least one data encoded laser beam, wherein said user data is indicative of amplitudes of said orthogonal aberration modes;

transmitting, through an atmospheric or free space optical path or at least two lenses positioned in said atmospheric or free space optical path, said data encoded laser beam to a receiver unit communicably coupled with said transmitting unit.

In sixth aspect, the present invention provides a method for decoding at least one user data from at least one data encoded laser beam in an optical communication system, said method comprising:

receiving, by a wavefront sensor in a receiver unit, said data encoded laser beam as one or more input beams;

detecting, by said wavefront sensor, presence of aberration in said input beams;

generating, by multiplex hologram in said wavefront sensor, at least one first and second aberration sensor output signals, in the case of the modal wavefront sensor, or only one aberration sensor output signal in the case of the zonal wavefront sensor, corresponding to each input laser beam;

transmitting, by at least one communication means, said first and second sensor output signals or said sensor output signal, from said wavefront sensor to a data processing unit for subsequent processing;

receiving, by said data processing unit, said first and second sensor output signals or said sensor output signal;

determining, said amplitudes of said orthogonal aberration modes;

decoding, by said amplitudes of said orthogonal aberration modes, said user data.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE ACCOMPANYING DRAWINGS

The above and other aspects, features, and advantages of certain exemplary embodiments of the present invention will be more apparent from the following description taken in conjunction with the accompanying drawings in which.

Persons skilled in the art will appreciate that the elements in the figures are illustrated for simplicity and clarity and may have not been drawn to scale. For example, the dimensions of some of the elements in the figures may be exaggerated relative to other elements to help to improve understanding of various exemplary embodiments of the present disclosure. Throughout the drawings, it should be noted that like reference numbers are used to depict the same or similar elements, features, and structures.

DETAILED DESCRIPTION OF THE PRESENT INVENTION

The following description with reference to the accompanying drawings is provided to assist in a comprehensive understanding of exemplary embodiments of the invention. It includes various specific details to assist in that understanding but these are to be regarded as merely exemplary.

Accordingly, those of ordinary skill in the art will recognize that various changes and modifications of the embodiments described herein can be made without departing from the scope of the invention. In addition, descriptions of well-known functions and constructions are omitted for clarity and conciseness.

The terms and words used in the following description and claims are not limited to the bibliographical meanings but are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise.

By the term "substantially" it is meant that the recited characteristics, parameters, or values need not be achieved exactly, but that deviations or variations, including for example, tolerances, measurement errors, measurement accuracy limitations and other factors known to those of skill in the art, may occur in amounts that do not preclude the effect, the characteristic was intended to provide.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

The objects, advantages and other novel features of the present invention will be apparent to those skilled in the art from the following detailed description when read in conjunction with the accompanying drawings.

In one implementation, for bi-directional communication there may be pair of transmission and receiving stations. However, the present invention describes a free space communication system that corresponds to unidirectional communication only.

Figure 1:
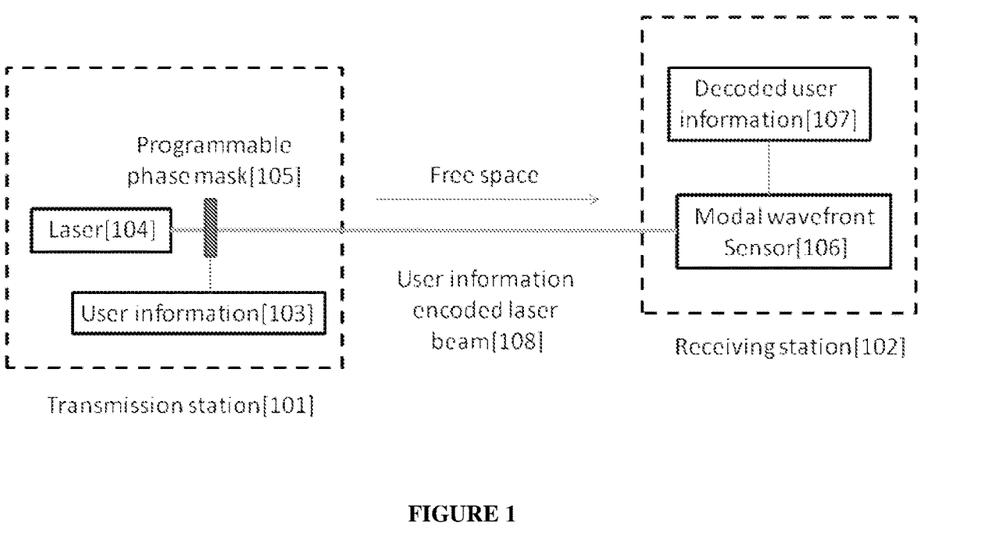
FIG. 1 is an illustration of a block diagram of the proposed communication system using the modal wavefront sensor, according to the subject matter of the present disclosure.

Reference is made to FIG. 1, wherein a block diagram of the proposed communication system using the modal wavefront sensor is illustrated.

Figure 2:
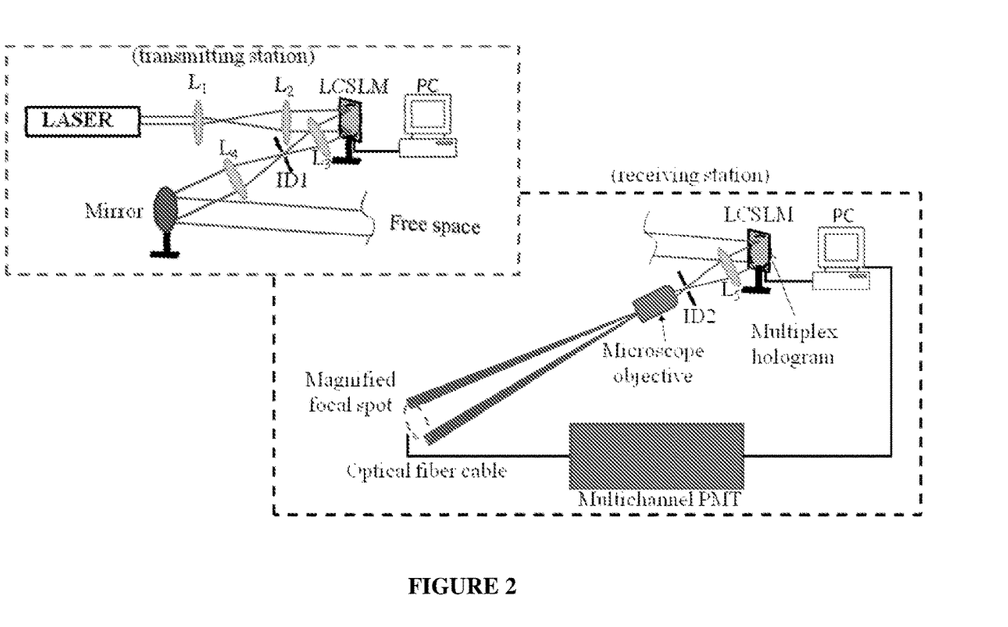
FIG. 2 is an illustration of one embodiment of a free space optical communication system, according to the present disclosure

Reference is made to FIG. 2, wherein one embodiment of a free space optical communication system is illustrated.

Figure 3:
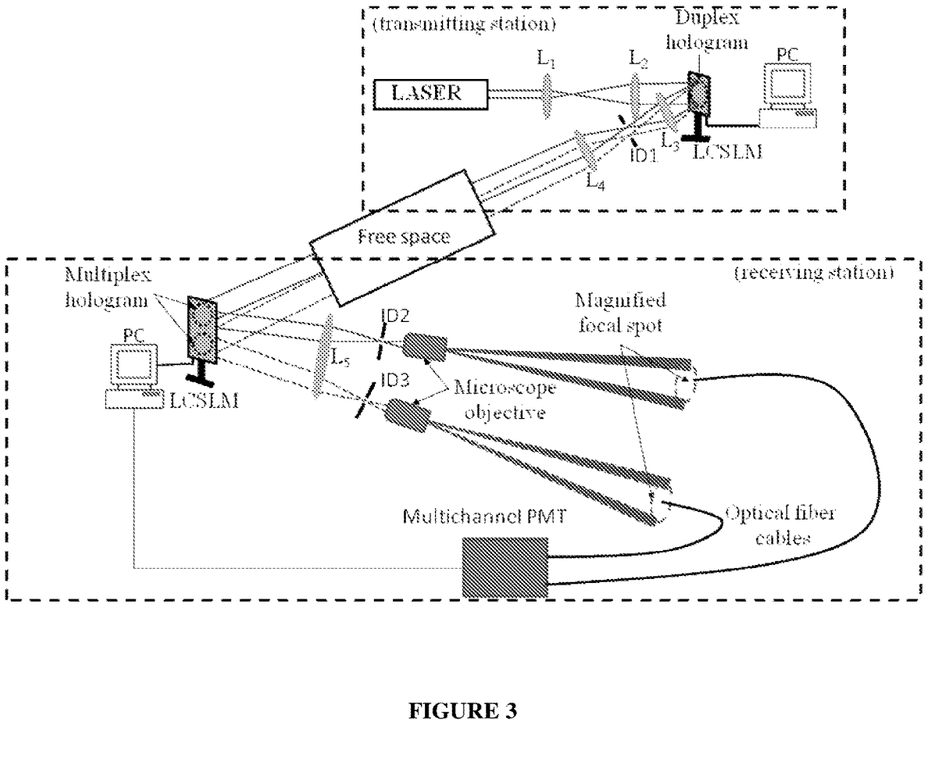
FIG. 3 is an illustration of another embodiment of a free space optical communication system, according to the present disclosure.

Reference is made to FIG. 3, wherein, another embodiment of a free space optical communication system is illustrated.

Figure 4:
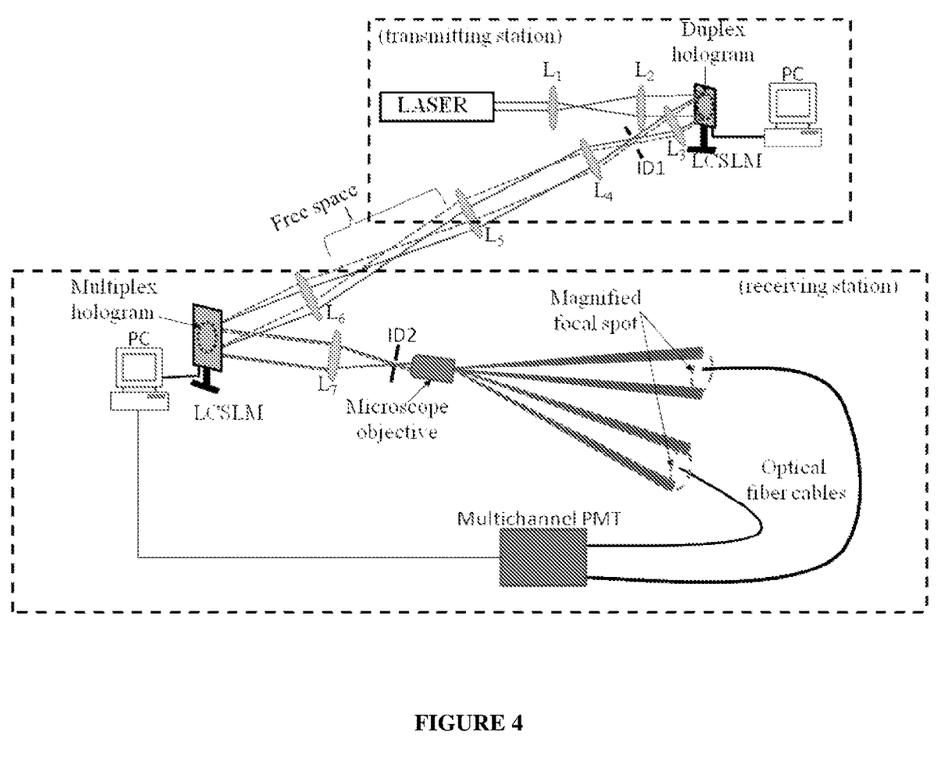
FIG. 4 is an illustration of yet another embodiment of a free space optical communication system, according to the present disclosure.

Reference is made to FIG. 4 wherein, yet another embodiment of a free space optical communication system is illustrated.

Figure 5:
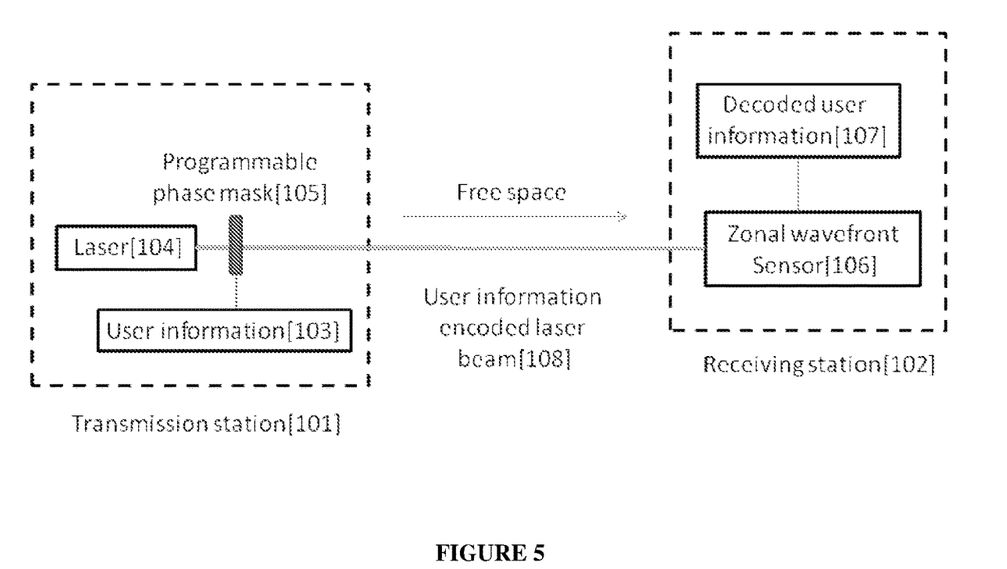
FIG. 5 is an illustration of a block diagram of the proposed communication system using the zonal wavefront sensor, in accordance with an embodiment of the present disclosure.

Reference is made to FIG. 5 wherein, a block diagram of the proposed communication system using the zonal wavefront sensor is illustrated.

Figure 6:
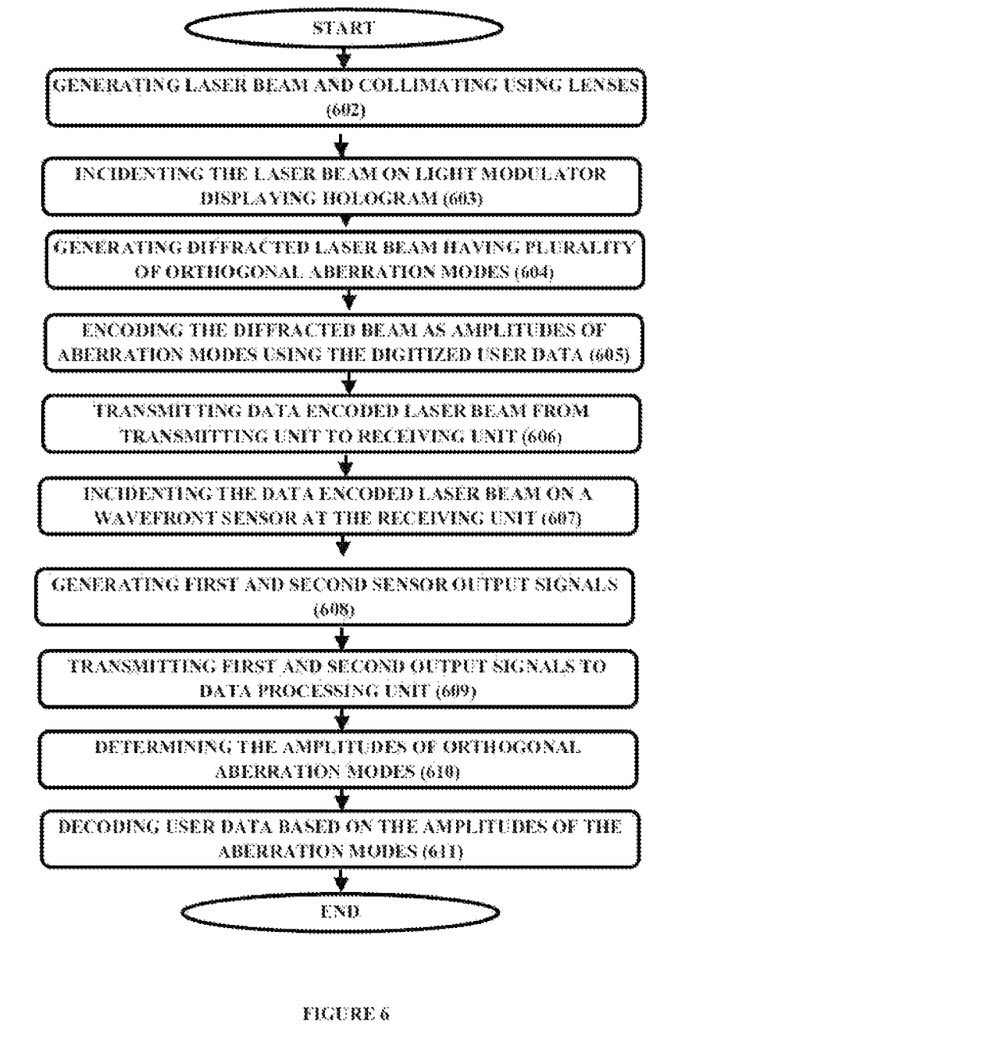
FIG. 6 is a flowchart illustrating a method for communicating user data from a transmitting station to a receiving station, in accordance with an embodiment of the present disclosure.

Reference is made to FIG. 6 wherein a detailed flowchart illustrating a method for communicating user data from a transmitting station to a receiving station is shown.

In one implementation a free space communication system is proposed, and the corresponding schematic is illustrated in FIG. 1. The orthogonal modes of aberration in a laser beam (104) are used as means for encoding the user information (103). The system comprises a transmission station (101) which transmits the user defined information in terms of the amplitudes of certain orthogonal aberration modes present in the transmitted beam. The beam (108) then travels through atmospheric or free space before it reaches the receiving station (102). The receiving station comprises a high speed wavefront sensor (106) of light beams. The wavefront sensor measures the amplitudes of various orthogonal aberration modes present in the incident beam at different instants of time. The amplitudes of the orthogonal modes at a certain regular time interval are then used to decode user information (107).

In one implementation, a diffracted laser beam can be aberrated with one or more number of orthogonal modes such as Zernike modes. The presence or absence of each such mode, including the polarity of the mode, can be measured using a modal wavefront sensor without being effected by the presence of the other aberration modes. The information with the user can be converted to a digital form using the digits 1, 0 and −1 and corresponding digits can be used to define the magnitudes of a combination of Zernike modes present in a beam at different instants of time. Thus a free space optical communication system, as illustrated in FIG. 1, comprises a transmitting station (101) where the user information is used to modulate the phase profile of a diffracted laser beam using a dynamic and programmable phase mask. The modulated beam (108) carrying the information travels the atmospheric or free space before it reaches the receiving station (102). The receiving station comprises a modal wavefront sensor (106). The speed of the modal wavefront sensor is high enough to resolve the incident laser phase profile modulation at different time instants. The receiving station (102) comprises a data processing unit that decodes the user information from the amplitudes of the aberration modes as a function of time.

In first embodiment of the proposed system, as illustrated in FIG. 2, the transmitting station comprises a laser beam, which is collimated by using a combination of two collimating lenses $L_1$ and $L_2$ and is then allowed to fall on the programmable phase mask implemented using a liquid crystal spatial light modulator (LCSLM). The LCSLM on the other hand comprises a two dimensional array of liquid crystal pixels whose transmission properties can be controlled using an interface. A set of instructions for generating hologram is sent to the LCSLM using the computer interface.

In one implementation of the first embodiment, the high speed modal wavefront sensor in the receiving station is adapted to measure the presence or absence along with the polarity of a particular orthogonal mode in the incident laser beam. The modal wavefront sensor comprises a programmable phase mask implemented using an LCSLM followed by a focusing lens which focuses certain diffracted orders from the LCSLM onto one or two iris diaphragms. The iris diaphragms, as illustrated in FIGS. 2, 3 and 4, ID2 or ID2 and ID3 is or are used to isolate the required diffracted orders from the unwanted diffracted orders. The diffracted orders transmitted by the iris diaphragms are magnified by the microscope objective(s) and are focused onto one end of a bunch of optical fiber cables (OFC). The other ends of the OFCs are positioned on a plurality of photomultiplier tubes (PMT). The PMT output is read by a PC with the help of a high speed data acquisition card.

In the first embodiment, the modal wavefront sensor output is independent of the variations in the laser intensity up to the limit of acceptable minimum signal to noise ratio. Thus the proposed system is not affected by the fluctuations in the intensity due to perturbations in the atmosphere.

In the first embodiment, in order to make the FSO communication system immune or less effected to or by wavefront distortions, the programmable phase mask in the transmission station modulates the laser beam in two different time slots which follow one another. In one time slot the laser beam is encoded with the digits representing the user data while in the other time slot the laser beam is encoded with the same digits with a negative sign. If the atmospheric perturbations are at a time scale greater than the duration of the two time slots, the difference in the sensor output at the receiving station between the signals in the two timeslots will be more immune to the atmosphere induced wavefront distortions.

In the first embodiment, as illustrated in FIG. 2, the hologram is configured to generate one +1 order diffracted beam carrying the phase profile of a linear combination of, for example N (where N is an integer) number of orthogonal aberration modes, at the focal plane of the lens $L_3$. An iris diaphragm (ID1) is used to isolate the +1 order from the other orders. The +1 order beam passing through ID1 is then collimated using the lens $L_4$ and transmitted to the receiver station.

In the first embodiment, the user information is digitized and converted to ternary system (i.e. number system with base 3). Each ternary number is then shifted one place towards the lower side so that 0, 1, 2 becomes −1, 0, 1. For each alternate clock cycle, N such digits are used to encode the +1 order beam coming out of the transmitting station with N number of Zernike modes. This clock cycle is immediately followed by another clock cycle where the +1 order is encoded using same shifted ternary digits with an opposite sign. The LCSLM in the receiving station displays a multiplex hologram, which is configured to generate two +1 orders for each of the N Zernike modes used in encoding, in order to sense the particular Zernike mode. In the case of the first embodiment, at the receiving station each N user specified digits are decoded by taking the difference between the sensor outputs corresponding to the two clock cycles where shifted ternary digits with opposite signs are used during encoding.

In the second embodiment of the proposed system, as illustrated in FIG. 3, the programmable phase mask in the transmitting station splits the incident laser beam into two beams, each modulated using the digital form of the user data with a positive sign and a negative sign respectively. The receiving station receives the two laser beams simultaneously, which are then incident on the same modal wavefront sensor. As the two beams travel through the same perturbation in the atmosphere and are carrying information using opposite polarity of the orthogonal modes, the sensor output difference between two beams at the receiving station will be less affected by the atmospheric turbulence.

In the second embodiment, a duplex hologram in the LCSLM in the transmitting station generates two +1 order beams travelling at a small angle with one another, as illustrated in FIG. 3. After travelling the atmospheric or the free space the two beams are incident on the LCSLM in the receiving station. The angle between the two +1 order beams is adjusted in such a way that in the receiving station the two beams are incident adjacent to one another. Two multiplex holograms are written in the two regions of the LCSLM in the receiving station where the two +1 order beams are incident. In the transmitting station N/2 number of shifted ternary digits are used to encode one +1 order beam while the other +1 order beam is encoded using same N/2 shifted ternary digits with a negative sign. Thus the two +1 order beams travel through the same medium carrying Zernike modes of opposite polarity. At the receiving station each N/2 user specified digits are decoded by taking the sensor output difference corresponding to the two +1 order beams. In this implementation, the new user data is transmitted in each clock cycle.

In the third embodiment of the proposed system as illustrated in FIG. 4, again the two laser beams are encoded using the opposite polarity of the aberration modes similar to the second embodiment. However the two laser beams travel to the receiving station via a 4f optical relay system. Use of 4f relay ensures that at the receiving station the two beams are incident on a common area of the modal wavefront sensor which is over and above the immunity provided against the atmospheric turbulences.

In the third embodiment, the transmitting station is very similar to that of the second embodiment. However here the plane of the LCSLM in the transmitting station is imaged onto the LCSLM in the receiving station with the help of a 4f relay optics. The lenses L5 and L6 should have a long focal length to cover the required distance between the two stations. As the two LCSLMs are on conjugate planes, the two +1 order beams incident on the same area on the LCSLM in the receiving station. Thus only one multiplex hologram needs to be written onto the same. The data encoding and decoding protocol for the third embodiment is same as the second embodiment. Thus the third embodiment also allows transmission of N/2 number user specified digits per clock cycle. The third embodiment may also have more than one 4f relay optics to image the LCSLM plane in the transmitting station on the LCSLM plane in the receiving station.

In all the implementations, the LCSLM is used to implement the programmable phase mask, however, the same may be done by using other similar devices or spatial light modulators and the like. Additionally the modal wavefront sensor at the receiving station may comprise a digital camera instead of the multichannel PMT. Further in all the three embodiments of the communication system the modal wavefront sensor may be replaced by a zonal wavefront sensor having the requisite frame rate.

In one implementation, as illustrated in FIG. 5 the proposed free space optical communication system may be implemented using a zonal wavefront sensor to detect the orthogonal aberration modes at the receiving station.

In one implementation, the method for communicating at least one user data from at least one transmitter to at least one receiver in an optical communication system is as illustrated in FIG. 6.

Some of the essential features of the present invention includes:
1. The presence or absence of each orthogonal aberration mode in the laser beam, including the polarity of the mode, can be measured using a modal wavefront sensor without being significantly effected by the presence of the other aberration modes.
2. The information with the user can be converted to a digital form using the digits 1, 0 and −1 and corresponding digits can be used to define the magnitudes of a combination of Zernike modes present in a beam, at different instants of time.
3. The speed of the modal wavefront sensor is high enough to resolve the incident laser phase profile modulation at different time instants.
4. The proposed system is not affected or less affected by the fluctuations in the intensity due to perturbations in the atmosphere.

Although implementations for free space optical communication system, apparatus and a method thereof have been described in language specific to structural features and/or methods, it is to be understood that the appended claims are not necessarily limited to the specific features or methods described. Rather, the specific features and methods are disclosed as examples of implementations for free space optical communication system, apparatus and a method thereof.

The invention claimed is:

1. A free space optical communication system comprising at least one transmitting unit and at least one receiving unit, wherein:
   said transmitting unit transmits at least one incident laser beam aberrated using plurality of orthogonal aberration modes forming a complete basis and at least one user data, said transmitting unit comprises:
      at least one light modulator displaying binary holograms configured to: encode, said incident laser beam using the said user data at different instants of time;
      generate, at least one data encoded laser beam; and thereby transmit said data encoded laser beam to said receiving unit;
      wherein, said user data in said data encoded laser beam is indicative of amplitudes relative to time of said orthogonal aberration modes forming a complete basis;
   said receiving unit communicably coupled to said transmitting unit, receives said data encoded laser beam as one or more input laser beams, wherein said receiving unit comprises: at least one wavefront sensor which can be a modal wavefront sensor or a zonal wavefront sensor, adapted to:
      detect the presence of aberration in said input laser beam;
      generate, first and second aberration sensor output signals, if the said wavefront sensor is a modal wavefront sensor, or only one aberration sensor output signal if the said wavefront sensor is a zonal wavefront sensor, corresponding to each input laser beam; and
      transmit said first and second aberration sensor output signals or said aberration sensor output signal, to a data processing unit for subsequent processing; said data processing unit operably coupled to said wavefront sensor and configured to: determine, said amplitudes of said orthogonal aberration modes forming a complete basis, using, a difference between said first and second aberration sensor output signals or said aberration sensor output signal; and thereby decode said user data, using said amplitudes of said orthogonal aberration modes forming a complete basis;
   wherein said light modulator in the transmitting unit is enabled to produce at least one beam from said incident laser beam, encoded at consecutive time slots, using opposite polarity of the digital order of the same user data, thereby transit said data encoded laser beam, to said receiving unit; wherein, said user data in said data encoded laser beam is indicative of amplitudes relative to time of said orthogonal aberration modes forming a complete basis;
   wherein the receiving unit receives the beam encoded using opposite polarity of the digital order of the same user data to generate the aberration sensor output signals; wherein the difference between the output signals, corresponding to the two consecutive time slots where the beam is encoded with reverse polarity of the same user data; decodes said user data, using said amplitudes of said orthogonal aberration modes forming a complete basis.

2. The free space optical communication system as claimed in claim 1, wherein said transmitting unit communicably coupled with said receiving unit using an atmospheric or free space optical path.

3. The free space optical communication system as claimed in claim 1, wherein said transmitting unit communicably coupled with said receiving unit using at least two lenses positioned in an atmospheric or free space optical path.

4. The free space optical communication system as claimed in claim 3, wherein said lenses comprises a focal length determined by the distance between said transmitting unit and said receiving unit.

5. The free space optical data transmission system as claimed in claim 1, wherein said user data is a digital data.

6. The free space optical communication system as claimed in claim 1, wherein said transmitting unit further comprises at least two collimating lenses having focal lengths that collimate said incident laser beam before being incident on said light modulator.

7. The free space optical data transmission system as claimed in claim 1, wherein said orthogonal aberration modes forming a complete basis are Zernike modes incorporated into said incident laser beam.

8. The free space optical communication system as claimed in claim 1, wherein said light modulator is a programmable phase mask or binary hologram that is implemented using at least one selected from liquid crystal spatial light modulator (LCSLM) or spatial light modulators.

9. The free space optical communication system as claimed in claim 8, wherein said programmable phase mask or binary hologram generates one or two data encoded laser beam or beams using at least one hologram, or at least one duplex hologram respectively.

10. The free space optical data transmission system as claimed in claim 1, wherein said wavefront sensor comprises a phase mask.

11. The free space optical data transmission system as claimed in claim 10, wherein said phase mask comprises at least one selected from liquid crystal spatial light modulator (LCSLM) or spatial light modulators.

12. The free space optical data transmission system as claimed in claim 11, wherein said LCSLM generates, said first and second aberration sensor output signals by diffracting said data encoded laser beam, using at least one multiplex hologram, in the case of the modal wavefront sensor, or only one aberration sensor output signal in the case of the zonal wavefront sensor.

13. The free space optical data transmission system as claimed in claim 1, wherein said first and second aberration sensor output signals or said aberration sensor output signal corresponding to at least one data encoded laser beam from the transmitting unit, is transmitted to said data processing unit using at least one selected from optical fiber cable and photomultiplier tube or digital camera or any combination thereof.

14. The free space optical data transmission system as claimed in claim 1, wherein said wavefront sensor comprises a phase mask.

15. The free space optical data transmission system as claimed in claim 1, wherein said first and second aberration sensor output signals or said aberration sensor output signal corresponding to at least one data encoded laser beam from the transmitting unit, is transmitted to said data processing unit using at least one selected from optical fiber cable and photomultiplier tube or digital camera or any combination thereof.

16. An apparatus for transmitting at least one data encoded laser beam having plurality of orthogonal aberration modes forming a complete basis in an optical communication system, said apparatus comprising:
at least two collimating lenses, to collimate said laser beam;
at least one light modulator unit, adapted to:
receive said laser beam, transmitted by said collimating lenses:
generate, using one or more binary hologram/holograms, at least one order of diffracted beam carrying a user defined phase profile;
modulate, said order of diffracted beam of said laser beam with a digital order of said user data;
generate at least one data encoded laser beam and thereby transmit said data encoded laser beam to a receiving unit, wherein said receiving unit is communicably coupled with said apparatus;
wherein, said user data in said data encoded laser beam is indicative of amplitudes relative to time of said orthogonal aberration modes forming a complete basis;
wherein said light modulator comprising a programmable phase mask or binary hologram;
wherein said programmable phase mask or binary hologram configured to obtain at least two +1 order diffracted beams from said incident laser beam using a duplex hologram, wherein said diffracted beams are first and second identical laser beams traveling at a small angle with one another; and
wherein said first identical laser beam is converted by encoding said user data into said diffracted laser beam, and the second identical laser beam is converted by encoding a reverse polarity of said user data into said diffracted laser beam, both at the same instant of time.

17. The apparatus as claimed in claim 16, wherein said orthogonal aberration modes forming a complete basis are integrated with said diffracted beam.

18. The apparatus as claimed in claim 16, wherein said programmable phase mask or binary hologram is implemented by using at least one selected from liquid crystal spatial light modulator (LCSLM) or spatial light modulators.

19. An apparatus for decoding user data at least two data encoded laser beams, encoded with reverse polarity of the digital order of same user data, each having plurality of orthogonal aberration modes forming a complete basis, from a transmitting unit in an optical communication system, wherein said user data being indicative of amplitudes of said orthogonal aberration modes forming a complete basis, said apparatus comprising:
at least one wavefront sensor which can be a modal wavefront sensor or a zonal wavefront sensor adapted to:
receive, said data encoded laser beam having the said orthogonal aberration modes forming a complete basis as one or more input laser beams from a transmitting unit communicably coupled with said apparatus;
detect, presence of aberration in said input laser beams;
generate, at least first and second sensor output signals, if the said wavefront sensor is a modal wavefront sensor, or only one aberration sensor output signal if the said wavefront sensor is a zonal wavefront sensor, corresponding to each input laser beam,
transmit, said first and second sensor output signals or sensor output signal, to a data processing unit for subsequent processing;
wherein, said data processing unit, operably coupled to said wavefront sensor, is configured to:
determine amplitudes of said orthogonal aberration modes forming a complete basis, using, the difference between said first and second aberration sensor output signals or said aberration sensor output signal and the difference between the output signals corresponding to the two beams encoded with reverse polarity of the same user data;
decode said user data, using said amplitudes of said orthogonal aberration modes forming a complete basis.

20. The apparatus as claimed in claim 19, wherein said wavefront sensor comprises a phase mask.

21. The apparatus as claimed in claim 20, wherein said phase mask comprises at least one selected from liquid crystal spatial light modulator (LCSLM) or spatial light modulators.

22. The apparatus as claimed in claim 21, wherein said LCSLM generates, said first and second aberration sensor output signals by diffracting said data encoded laser beam, using at least one multiplex hologram, in the case of the modal wavefront sensor, or only one aberration sensor output signal in the case of the zonal wavefront sensor.

23. The apparatus as claimed in claim 19, wherein said first and second sensor output signals or sensor output signal corresponding to the data encoded laser beam from the transmitting unit, transmitted to said data processing unit, by using at least one selected from optical fiber cable and photomultiplier tube or digital camera or any combination thereof.

24. A method for communicating at least one user data from at least one transmitter to at least one receiver in an optical communication system, said method comprising:
generating, by a laser generating means in said transmitter, at least one incident laser beam;
collimating, by two or more collimating lens, said incident laser beam;
incidence, said incident laser beam on at least one light modulator;
generating, by said light modulator displaying at least one hologram, at least one diffracted laser beam having plurality of orthogonal aberration modes forming a complete basis;
encoding, by said light modulator, said diffracted beam of said incident laser beam with a digital order of said user data, wherein said user data is indicative of amplitudes in said orthogonal aberration modes forming a complete basis;
transmitting, through an atmospheric or free space optical path or at least two lenses positioned in said atmospheric or free space optical path, said data encoded laser beam to said receiver unit;
receiving, by a wavefront sensor in said receiver, said data encoded laser beam as one or more input beams;
detecting, by said wavefront sensor, presence of aberration in said input beams;
generating, by multiplex hologram in said wavefront sensor, at least one first and second aberration sensor output signals, if the said wavefront is a modal wavefront sensor, or only one aberration sensor output signal if the said wavefront is a zonal wavefront sensor, corresponding to each input laser beam;

transmitting, by at least one communication means, said first and second sensor output signals or said sensor output signal, from said wavefront sensor to a data processing unit for subsequent processing;

receiving, at said data processing unit, said first and second sensor output signals or said sensor output signal, and thereby determining, said amplitudes of said orthogonal aberration modes forming a complete basis;

decoding, by said amplitudes of said orthogonal aberration modes forming a complete basis, said user data;

wherein a multiplex hologram configured to generate at least two +1 order diffracted beams from said incident laser beam to obtain at least two identical laser beams travelling at a small angle with one another, encoded with reverse polarity of the digital order of the same user data; wherein, said user data in said data encoded laser beam is indicative of amplitudes relative to time of said orthogonal aberration modes forming a complete basis; wherein the receiver receives the beams encoded using opposite polarity of the digital order of the same user data to generate the aberration sensor output signals and wherein the difference between the output signals, corresponding to the two beams encoded with reverse polarity of the same user data;

decodes said user data, using said amplitudes of said orthogonal aberration modes forming a complete basis.

25. The method as claimed in claim 24, wherein said communication means at the receiving unit generates sensor output signal corresponding to the data encoded laser beam from the transmitting unit, transmitted to said data processing unit, by using at least one selected from optical fiber cable and photomultiplier tube or digital camera or any combination thereof.

26. A method for generating at least one data encoded laser beam in an optical communication system, said method comprising:

generating, by a laser generating means in a transmitting unit, at least one incident laser beam;

collimating, by two or more collimating lenses, said incident laser beam;

incidence, said incident laser beam on at least one light modulator; generating, by at least one hologram provided on said light modulator, at least one order of a diffracted beam carrying a user defined phase profile wherein said diffracted beam includes plurality of orthogonal aberration modes forming a complete basis;

encoding, by said light modulator, a digital order, which is a shifted ternary number, at least one user data with said diffracted beam of said laser beam at consecutive instants of time;

generating, at least one data encoded laser beam, encoded at consecutive time slots using opposite polarity of the digital order of the same user data, wherein said user data is indicative of amplitudes of said orthogonal aberration modes forming a complete basis;

transmitting, through an atmospheric or free space optical path or at least two lenses positioned in said atmospheric or free space optical path, said data encoded laser beam to a receiver unit communicably coupled with said transmitting unit.

27. A method for decoding at least one user data from at least one laser beam from a transmitting unit encoded with a digital order of the user data; wherein, said user data in said data encoded laser beam is indicative of amplitudes relative to time of orthogonal aberration modes forming a complete basis, in an optical communication system, said method comprising:

receiving, by a wavefront sensor in a receiver unit, said data encoded laser beam as one or more input beams that are encoded at consecutive time slots using opposite polarity of the digital order of the same user data;

detecting, by said wavefront sensor, presence of aberration in said input beams;

generating, by multiplex hologram in said wavefront sensor, at least one first and second aberration sensor output signals, if the wavefront is a modal wavefront sensor, or only one aberration sensor output signal if the wavefront is a zonal wavefront sensor, corresponding to each input laser beam;

transmitting, by at least one communication means, said first and second sensor output signals or said sensor output signal, from said wavefront sensor to a data processing unit for subsequent processing;

receiving, at said data processing unit, said first and second sensor output signals or said sensor output signal;

determining, said amplitudes of said orthogonal aberration modes forming a complete basis;

decoding, by said amplitudes of said orthogonal aberration modes forming a complete basis, said user data.

28. A method for generating at least one data encoded laser beam in an optical communication system, said method comprising:

generating, by a laser generating means in a transmitting unit, at least one incident laser beam;

collimating, by two or more collimating lenses, said incident laser beam;

incidence, said incident laser beam on at least one light modulator; generating, by at least one duplex hologram provided on said light modulator, at least one order of a diffracted beam carrying a user defined phase profile wherein said diffracted beam includes plurality of orthogonal aberration modes forming a complete basis;

encoding, by said light modulator, a digital order, which is a shifted ternary number, at least one user data with said diffracted beam of said laser beam at consecutive instants of time;

generating, two +1 order data encoded laser beams encoded with reverse polarity of the digital order of same user data and travelling at a small angle with one another, wherein said user data is indicative of amplitudes of said orthogonal aberration modes forming a complete basis;

transmitting, through an atmospheric or free space optical path or at least two lenses positioned in said atmospheric or free space optical path, said data encoded laser beam to a receiver unit communicably coupled with said transmitting unit.

29. A method for decoding at least one user data from at least one laser beam from a transmitting unit encoded with a digital order of the user data; wherein, said user data in said data encoded laser beam is indicative of amplitudes relative to time of orthogonal aberration modes forming a complete basis, in an optical communication system, said method comprising:

receiving, by a wavefront sensor in a receiver unit, said data encoded laser beam as two input beams traveling at a small angle with one another and encoded with reverse polarity of the digital order of the same user data using a duplex hologram;

detecting, by said wavefront sensor, presence of aberration in said input beams;
generating, by multiplex hologram in said wavefront sensor, at least one first and second aberration sensor output signals, if the wavefront is a modal wavefront sensor, or only one aberration sensor output signal if the wavefront is a zonal wavefront sensor, corresponding to each input laser beam;
  wherein generating the at least one first and second aberration sensor output signals comprising; generating at least two +1 order diffracted beams from said two input beams to obtain two identical laser beams;
transmitting, by at least one communication means, said first and second sensor output signals or said sensor output signal, from said wavefront sensor to a data processing unit for subsequent processing;
receiving, at said data processing unit, said first and second sensor output signals or said sensor output signal;
determining, said amplitudes of said orthogonal aberration modes forming a complete basis;
decoding, by said amplitudes of said orthogonal aberration modes forming a complete basis, said user data.

* * * * *